US010511449B2

(12) United States Patent
Nishio et al.

(10) Patent No.: US 10,511,449 B2
(45) Date of Patent: Dec. 17, 2019

(54) AUTHENTICATION METHOD, NOTIFICATION METHOD, SOURCE DEVICE, AND SINK DEVICE

(71) Applicant: Panasonic Intellectual Property Corporation of America, Torrance, CA (US)

(72) Inventors: Toshiroh Nishio, Osaka (JP); Masaya Yamamoto, Kyoto (JP); Masayuki Kozuka, Osaka (JP); Yoshihiro Mori, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 233 days.

(21) Appl. No.: 15/644,862

(22) Filed: Jul. 10, 2017

(65) Prior Publication Data

US 2017/0317835 A1 Nov. 2, 2017

Related U.S. Application Data

(63) Continuation of application No. PCT/JP2016/002948, filed on Jun. 20, 2016.
(Continued)

(30) Foreign Application Priority Data

May 31, 2016 (JP) ................................. 2016-109584

(51) Int. Cl.
*H04L 29/06* (2006.01)
*H04L 9/32* (2006.01)
(Continued)

(52) U.S. Cl.
CPC .............. *H04L 9/3263* (2013.01); *G06F 3/14* (2013.01); *G06F 7/588* (2013.01); *G06F 21/44* (2013.01);
(Continued)

(58) Field of Classification Search
CPC ... H04L 9/32; H04L 63/08; G06F 3/14; G06F 22/21
See application file for complete search history.

(56) References Cited

U.S. PATENT DOCUMENTS 8,990,574 B1 * 3/2015 Priyadarshi ......... H04L 63/0823
713/176
2013/0080662 A1 * 3/2013 Bourque ................ G09G 5/006
710/10

OTHER PUBLICATIONS

Extended European Search Report dated May 2, 2018 in corresponding European Patent Application No. 16841020.7.
(Continued)

*Primary Examiner* — Wasika Nipa
(74) *Attorney, Agent, or Firm* — Wenderoth, Lind & Ponack, LLP

(57) ABSTRACT

A method for use in a source device includes: acquiring a random number; transmitting the random number to a sink device through a High Definition Multimedia Interface-Consumer Electronics Control (HDMI-CEC) bus; receiving first signature information and capability information from the sink device through the HDMI-CEC bus, the first signature information being information in which the random number is encrypted with a first secret key of the sink device, the capability information being information about a display capability of the sink device; acquiring a result of a first determination whether first decrypted information is compatible with the transmitted random number, the first decrypted information being obtained by decrypting the first signature information with a first public key paired with the
(Continued)

first secret key; determining that the received capability information is correct information when the result of the first determination is that the first decrypted information is compatible with the transmitted random number; and outputting video corresponding to the capability information to sink device.

9 Claims, 12 Drawing Sheets

Related U.S. Application Data

(60) Provisional application No. 62/213,825, filed on Sep. 3, 2015.

(51) Int. Cl.
    *G06F 7/58*     (2006.01)
    *H04L 9/14*     (2006.01)
    *H04L 9/30*     (2006.01)
    *G06F 3/14*     (2006.01)
    *G06F 21/44*     (2013.01)
    *G09G 5/00*     (2006.01)
    *H04N 21/4363*     (2011.01)
    *H04N 21/4367*     (2011.01)

(52) U.S. Cl.
    CPC ............. *G09G 5/005* (2013.01); *H04L 9/14* (2013.01); *H04L 9/30* (2013.01); *H04L 9/32* (2013.01); *H04L 9/321* (2013.01); *H04L 9/3247* (2013.01); *H04L 9/3271* (2013.01); *H04L 63/0838* (2013.01); *H04N 21/4367* (2013.01); *H04N 21/43635* (2013.01); *G06F 2221/2103* (2013.01); *H04L 2209/60* (2013.01)

(56) References Cited

OTHER PUBLICATIONS

International Search Report of PCT application No. PCT/JP2016/002948 dated Sep. 20, 2016.
High-Definition Multimedia Interface, Specification Version 1.3a, Nov. 10, 2006.

\* cited by examiner

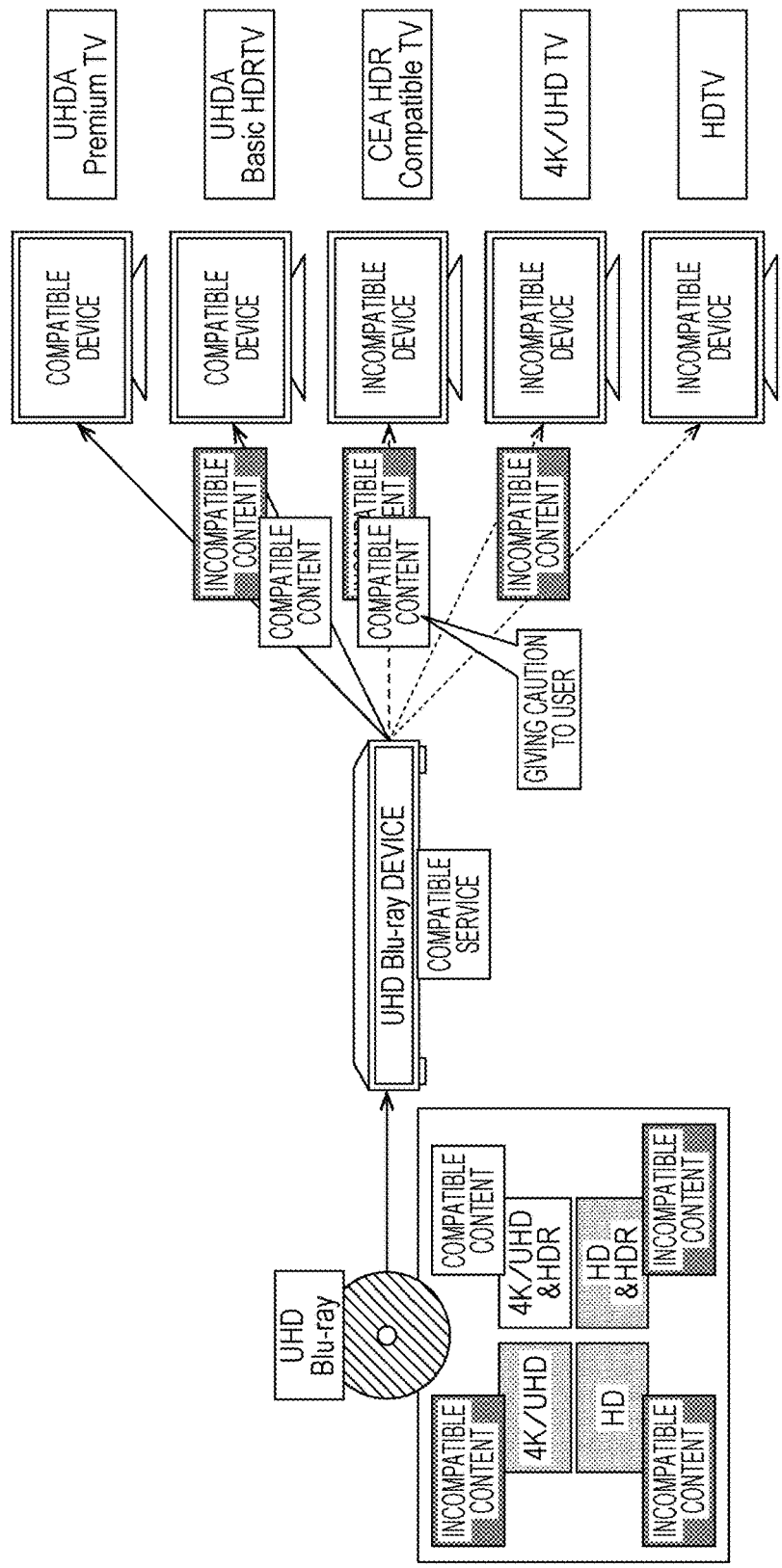

AUTHENTICATION METHOD, NOTIFICATION METHOD, SOURCE DEVICE, AND SINK DEVICE

BACKGROUND

1. Technical Field

The present disclosure relates to an authentication method, a notification method, a source device, and a sink device.

2. Description of the Related Art

Conventionally, it is disclosed that in High-Definition Multimedia Interface (HDMI) (registered trademark), bidirectional communication is conducted using an HDMI (registered trademark) Consumer Electronics Control (CEC) bus between devices connected to each other in a form of HDMI (registered trademark) (for example, see High-Definition Multimedia Interface, Specification Version 1.3a).

SUMMARY

However, it is necessary to further improve the technology of High-Definition Multimedia Interface, Specification Version 1.3a.

In one general aspect, the techniques disclosed here feature a method for use in a source device, the method including: acquiring a random number; transmitting the acquired random number to a sink device through a High Definition Multimedia Interface-Consumer Electronics Control (HDMI-CEC) bus; receiving first signature information and capability information from the sink device through the HDMI-CEC bus, the first signature information being information in which the random number is encrypted with a first secret key correlated with the sink device, the capability information being information about a display capability of the sink device; acquiring a result of a first determination whether first decrypted information is compatible with the transmitted random number, the first decrypted information being obtained by decrypting the received first signature information with a first public key paired with the first secret key; when the result of the first determination is that the first decrypted information is compatible with the transmitted random number, determining that the received capability information is correct information; and outputting video corresponding to the capability information determined to be correct information to the sink device.

These comprehensive or specific aspects may be implemented by a device, a system, an integrated circuit, a computer program, or a computer-readable recording medium such as a CD-ROM, or implemented by any combination of a device, a system, an integrated circuit, a computer program, and a recording medium.

According to one aspect of the present disclosure, the further improvement can be obtained.

Further advantageous effects of the present disclosure will appear from the following description and accompanying drawings. The advantageous effects of the present disclosure may individually be provided by various exemplary embodiments and features disclosed in the description and accompanying drawings, but all the advantageous effects are not necessarily provided.

BRIEF DESCRIPTION OF THE DRAWINGS

FIG. 12 is a view illustrating a relationship among the compatible content, the compatible service, and the compatible device in Case 3.

Figure 1:
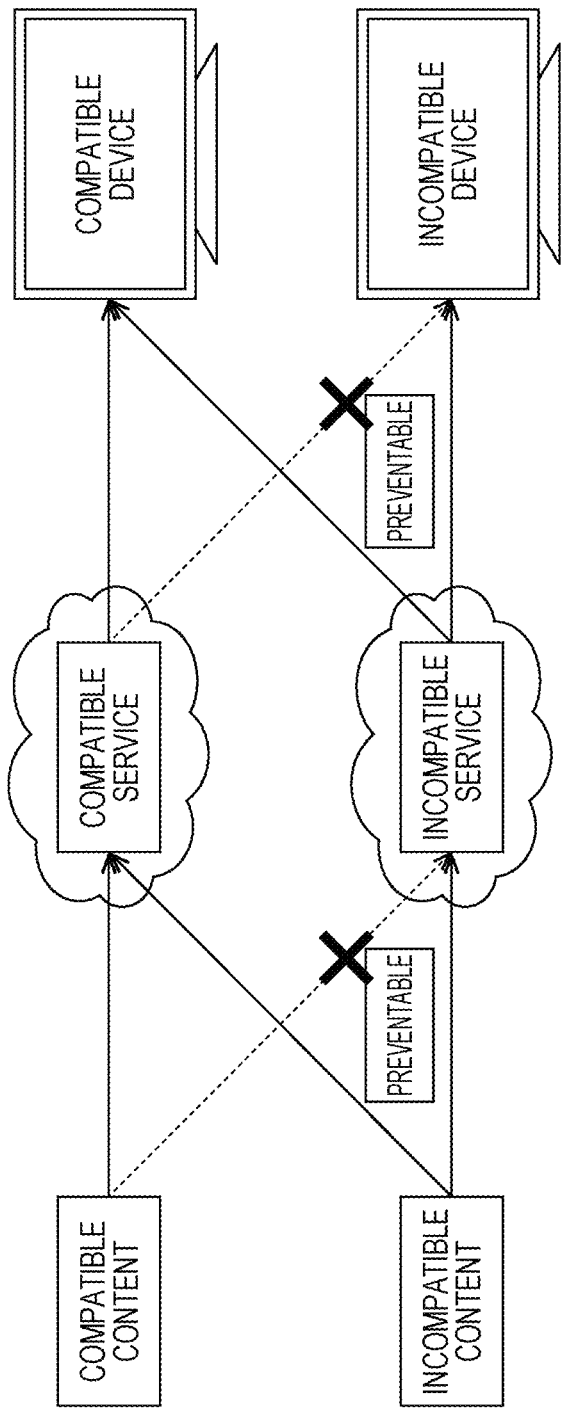
FIG. 1 is a view illustrating Case 1 in which a high dynamic range (HDR) content is directly provided to a display device by distribution service.

DETAILED DESCRIPTION (Knowledge Underlying the Present Disclosure)

The inventor of the present disclosure found that the following problem occurs in that the bidirectional communication through the HDMI communication, which is described in "BACKGROUND ART".

Nowadays, a technology of displaying high dynamic range (HDR) video, which is the video in which luminance is defined by the HDR of a dynamic range broader than a dynamic range in which conventional video luminance is defined, on display devices such as a TV set is known with the progress of an imaging technology. In the case where the HDR video is displayed on the display device, the display device can display the HDR video when technologically satisfying compatibility for the display of the HDR video. That is, even for the display device satisfying the compatibility for the display of the HDR video, there may be the display device that can hardly display the video with video quality intended by an HDR video producer. Specifically, there may be a display device having very poor display capability like a display device that performs, even if a luminance of 500 nit is indicated in a video signal, the display with the luminance largely lowered from 500 nit.

Even if a user prepares an HDR-compatible content, an HDR-compatible reproduction device, and an HDR-compatible display device (for example, an HDR-compatible TV (hereinafter, referred to as an HDRTV)), the user cannot enjoy the HDR video when the HDRTV has the poor display capability. Additionally, the user hardly determines whether quality of the video displayed on the HDRTV satisfies (is compatible with) a quality criterion of the HDR video.

When the HDRTV having the poor display capability goes on the market, possibly the user misunderstands that the HDR video has the poor quality because the user hardly determines whether the HDRTV has the poor display capability. For this reason, there is a possibility that the problem that the HDRTV has the poor display capability become insignificant. Therefore, it is necessary that the poor-display-capability display device such as the HDRTV that can display only the video not satisfying the quality criterion of the HDR video be removed while the good-display-capability display device such as the HDRTV that can display the video satisfying the quality criterion of the HDR video is distributed in the market. Otherwise, the user cannot correctly recognize the HDR video, but there is a risk of not promoting the spread of the HDR technology.

The following three cases are conceivable as means for displaying the HDR video on the display device.

Case 1: The case where an HDR video content (hereinafter, referred to as an HDR content) is directly provided to the display device by the distribution service (distribution cloud)

Case 2: The case where the HDR content is distributed to the distribution set top box (STB) by the distribution service and provided from the STB to the display device connected to the STB in the form of HDMI Case 3: The loosely-coupled case where each of the reproduction device (UHD BD player) that reproduces a UHD BD (Ultra HD Blu-ray (registered trademark) Disc) and the display device is not connected to a network while the reproduction device and the display device are connected to each other in the form of HDMI The three cases will be described below.

Case 1 in which the HDR content is directly provided to the display device by the distribution service will be described below with reference to FIG. 1.

FIG. 1 is a view illustrating Case 1 in which the HDR content is directly provided to the display device by the distribution service.

As illustrated in FIG. 1, Case 1 is the case where the HDR content is directly provided to the display device by the distribution service.

In Case 1, a providing route until the display of the HDR content on the display device varies based on whether the HDR content is an ultra high definition alliance (UHDA) authentication content satisfying the quality criterion of the HDR video defined by UHDA or an incompatible content not satisfying the quality criterion. The providing route until the display of the HDR content on the display device varies based on whether the distribution service is a UHDA authentication service (the compatible service satisfying the quality criterion) or the incompatible service not satisfying the quality criterion. The providing route until the display of the HDR content on the display device varies based on whether the display device is a UHDA authentication device (the compatible device satisfying the quality criterion) or the incompatible device not satisfying the quality criterion. At this point, it is necessary that the compatible content be prevented from being provided to the display device by the incompatible service, and that the compatible service be prevented from being provided to the incompatible device. That is, it is necessary that a destination of the compatible content be limited to the compatible service and the compatible device.

In Case 1, there is technical means for checking whether the display device that displays the content compatible with the quality criterion is a compatible product satisfying the quality criterion, using the network, in the distribution service on an upstream side or the distribution content side on the further upstream side of the distribution service on the upstream side. Therefore, the destination of the compatible content satisfying the quality criterion can be limited only to the compatible device. That is, when agreement is obtained from a content provider or a distributor, the compatible content can be displayed on the compatible device only through the compatible service.

Specifically, in Case 1, the use of the network can display the compatible content only on the compatible device through the compatible service.

For example, Case 1 can be implemented when the following items (1) to (3) are provided using nontechnical means such as a license agreement.

(1) A condition that a compatible service provider provides the distribution service only to the compatible device (display device) is attached as a logo license providing condition on the license agreement.

For example, in the case where the display device is the TV set, it is conceivable that the compatible service provider is obligated to provide a reproduction module (software) corresponding to the compatible service only to the TV set that is of the compatible device (to include the provision of the reproduction module only to the TV set in inspection receiving items of the service). For example, in the case where the display device is a personal computer (PC) or a tablet, it is conceivable that the compatible service provider is obligated to do the following. Software (APP) is downloaded in order that the display device receives the distribution service, and capability of a target terminal is checked through the network when the distribution service is available. The use of the software is permitted only when the display device is matched with the compatible device.

(2) A condition that a content provider provides the compatible content only to the compatible service provider is attached as the logo license providing condition on the license agreement.

(3) An approved test center (ATC) or the like checks whether the quality criterion is satisfied, and the standardization organization (for example, UHDA) that draws up the quality criterion grants permission after receiving a satisfactory checking result from the ATC. Then, the compatible device (such as the TV set) is productized.

Case 2 in which the HDR content is distributed to the distribution STB by the distribution service and provided from the STB to the display device connected to the STB in the form of HDMI will be described below with reference to FIG. 2.

Figure 2:
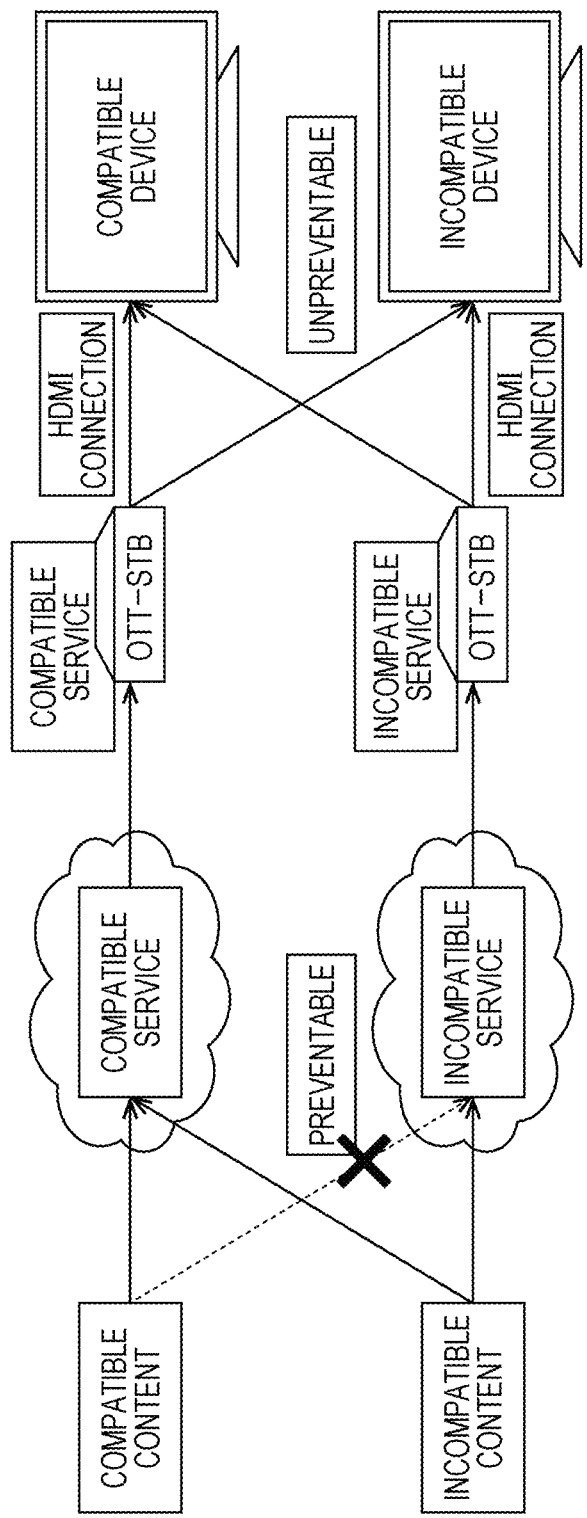
FIG. 2 is a view illustrating Case 2 in which the HDR content is distributed to a distribution set top box (STB) by the distribution service and provided from the STB to the display device connected to the STB in a form of HDMI.

FIG. 2 is a view illustrating Case 2 in which the HDR content is distributed to the distribution STB by the distribution service and provided from the STB to the display device connected to the STB in the form of HDMI.

As illustrated in FIG. 2, Case 2 is the case where the HDR content is provided to the display device through the STB by the distribution service.

In Case 2, unlike Case 1, the HDR content is distributed to the STB connected to the display device in the form of HDMI, and the STB provides the distributed HDR content to the display device. That is, in Case 2, the HDR content is output to the display device from the device connected to the display device in the form of HDMI. Even if the display device receives the provision of the HDR content using the distribution service, sometimes the HDR content is not directly provided to the display device, but the HDR content is provided to the display device through the reproduction module that is included in the STB or UHD BD player to reproduce the distribution content.

In this case, the STB that receives the content distribution from the distribution service and the display device are connected to each other in the form of HDMI. In the case where the content is provided to the display device through HDMI, because of absence of a mechanism in which the STB determines whether the display device connected to the STB is the compatible device, it is difficult that the destination of the compatible content is limited only to the compatible device. That is, in Case 2, the STB that is the compatible device cannot be prevented from providing the HDR content to the incompatible device.

Case 3 that is the loosely-coupled case in which each of the reproduction device (UHD BD player) that reproduces the UHD BD and the display device is not connected to the network while the reproduction device and the display device are connected to each other in the form of HDMI will be described below with reference to FIG. 3.

Figure 3:
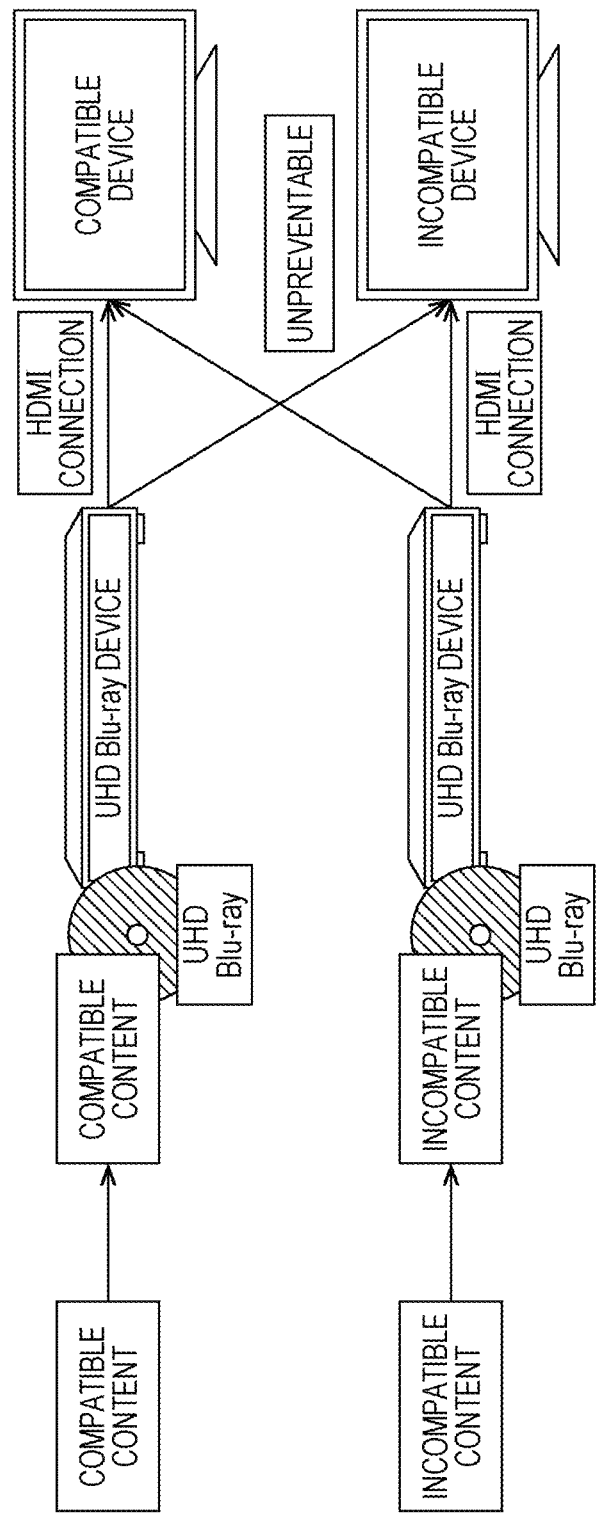
FIG. 3 is a view illustrating loosely-coupled Case 3 in which a reproduction device and the display device are not connected to a network while the reproduction device and the display device are connected to each other in the form of HDMI.

FIG. 3 is a view illustrating loosely-coupled Case 3 in which the reproduction device and the display device are not connected to the network while the reproduction device and the display device are connected to each other in the form of HDMI.

As illustrated in FIG. 3, in Case 3, the UHD BD player reproduces the optical disk such as the UHD BD in which the HDR content is recorded, and outputs a reproduced result to the display device connected to the UHD BD player in the form of HDMI.

In Case 3, unlike Cases 1 and 2, the content stored in the optical disk is displayed on the display device. In Case 3, like Case 2, the HDR content reproduced from the device (reproduction device) connected to the display device in the form of HDMI is output. In the case where the reproduction device and the display device are connected to each other in the form of HDMI, like Case 2, because of the absence of the mechanism in which the reproduction device determines whether the display device connected to the reproduction device is the compatible device, it is difficult that the destination of the compatible content is limited only to the compatible device. That is, in Case 3, the compatible device (reproduction device) cannot be prevented from providing the HDR content to the incompatible device (display device).

Thus, in Cases 2 and 3, the content provider and the distribution service provider are not directly connected to the display device in the form of HDMI through the network. Therefore, unlike Case 1, it is difficult that the compatible content is provided only to the compatible device only by the license agreement.

The present disclosure provides a method for displaying the compatible content only on the compatible device (display device) even in Cases 2 and 3. Specifically, an HDMI communication protocol is expanded to provide an authentication method in which an HDMI source device determines whether the display device (sink device) is the compatible device.

Between the source device and the sink device (display device) connected to each other in the form of HDMI, the sink device transmits extended display identification data (EDID) to the source device, whereby a characteristic of a signal receivable with the sink device is transferred to the source device from a viewpoint of compatibility. That is, it is conceivable that whether the sink device is the compatible device is determined using the EDID. For example, it is conceivable that when the standardization organization that draws up the quality criterion adds a flag indicating that the display device retaining the EDID is the compatible device to the EDID, the source device can check the flag to easily determine whether the display device is the compatible device.

However, in the method, when the flag of the EDID stored in the incompatible device is set, the source device mistakes the incompatible device as the compatible device by determining the flag. Even in the incompatible device, the HDR signal of the compatible content can be received through the HDMI and displayed when the compatibility standard for decrypting and displaying the HDR signal constituting the HDR content is satisfied. Accordingly, the display quality of the HDR content can hardly be guaranteed.

In the case where such cases are discovered, the standardization organization can possibly pursue a manufacture who receives the license from the standardization organization for breach of contract. On the other hand, it is very difficult to take a countermeasure for a manufacture who does not receive the license.

Accordingly, the compatible content can hardly be provided only to the compatible device only by adding the flag indicating the compatible device to the EDID.

As disclosed in High-Definition Multimedia Interface, Specification Version 1.3a, the HDMI includes a bus called an HDMI consumer electronics control (CEC) bus that conducts bidirectional communication in order to control a device group constructed up to 10 devices connected to one another in the form of HDMI.

In the HDMI-CEC bus, a control signal can be exchanged between one device of the device group and another device in order to control the one device of the device group and another device. When the HDMI-CEC bus is used, the source device can conduct the bidirectional communication with the sink device. Thus, the use of the HDMI-CEC bus can conduct mutual communication even between devices produced by different manufacturers. When the standardization organization decides the communication protocol on the HDMI-CEC bus, the communication can be conducted through the HDMI-CEC bus in order that the source device determines whether the sink device is the compatible device.

However, in the HDMI-CEC bus, the communication is conducted by a plain text. Therefore, when an analyzer is connected between the devices connected to each other in the form of HDMI, the content exchanged between the devices can easily be analyzed. Accordingly, in this method, when false information indicating that the incompatible device is the compatible device is transferred to the source device, there is a risk that the source device mistakes the incompatible device as the compatible device. Even in the incompatible device, the HDR signal of the compatible content can be received through the HDMI and displayed when the compatibility standard for decrypting and displaying the HDR signal is satisfied, and when the information indicating the compatible device is transferred to the source device through the HDMI-CEC bus. Even if the HDMI-CEC bus is used, sometimes the display quality of the HDR content can hardly be guaranteed.

In the case where such cases are discovered, the standardization organization can possibly pursue a manufacture who receives the license from the standardization organization for breach of contract. On the other hand, it is very difficult to take a countermeasure for a manufacture who does not receive the license.

Accordingly, the compatible content can hardly be provided only to the compatible device only by the use of the HDMI-CEC bus.

In view of the above, the inventor studied the following remedial measures in order to solve the problem.

One aspect of the present disclosure provides a method for use in a source device, the method including: acquiring a random number; transmitting the acquired random number to a sink device through a High Definition Multimedia Interface-Consumer Electronics Control (HDMI-CEC) bus; receiving first signature information and capability information from the sink device through the HDMI-CEC bus, the first signature information being information in which the random number is encrypted with a first secret key correlated with the sink device, the capability information being information about a display capability of the sink device; acquiring a result of a first determination whether first decrypted information is compatible with the transmitted random number, the first decrypted information being obtained by decrypting the received first signature information with a first public key paired with the first secret key; when the result of the first determination is that the first decrypted information is compatible with the transmitted random number, determining that the received capability information is correct information; and outputting video corresponding to the capability information determined to be correct information to the sink device.

Therefore, the source device can easily determine whether the received capability information is the information transmitted from the sink device. That is, the source device can easily determine whether man-in-the-middle attack occurs between the source device and the sink device. The use of the communication through the HDMI-CEC bus can easily conduct communication between the source device and the sink device even if another device is connected in the form of HDMI between the source device and the sink device.

The method may further include acquiring a result of a second determination whether second decrypted information is correct information, the second decrypted information being obtained by decrypting second signature information with a second public key corresponding to a second secret key, the second public key being externally acquired with the source device. At this point, certification information and the second signature information are received from the sink device in the receiving, the certification information including the first public key and the capability information, the second signature information including information in which the sink device encrypts the certification information with the second secret key, the second secret key being an externally-acquired second secret key, the first determination is a determination whether the first decrypted information is compatible with the transmitted random number, the first decrypted information being obtained by decrypting the received first signature information with the first public key included in the certification information, and when the result of the first determination is that the first decrypted information is compatible with the transmitted random number, and when the result of the second determination is that the second decrypted information is correct information, a determination that the received capability information is correct information is made in the determining.

Thus, the source device can determine whether spoofing attack in which an encryption key except for the second secret key is used is made by making the second determination. Using the results of the first determination and second determination, the source device can determine that the certification information received from the sink device is not falsified. Therefore, the source device can easily determine whether the sink device is the device satisfying the quality criterion based on the capability information stored in the certification information.

A random number generated in the source device is acquired as the random number acquired in the acquiring of the random number, and a result of a first determination made by the source device is acquired as the result of the first determination acquired in the acquiring of the result of the first determination.

Therefore, the generated random number and the result of the first determination can be obtained even if the source device is not connected to the network.

A random number generated in the source device is acquired as the random number acquired in the acquiring of the random number, a result of a first determination made by the source device is acquired as the result of the first determination acquired in the acquiring of the result of the first determination, and a result of a second determination made by the source device is acquired as the result of the second determination acquired in the acquiring of the result of the second determination.

Therefore, the generated random number and the results of the first determination and second determination can be obtained even if the source device is not connected to the network.

The authentication method may further include transmitting the received first signature information and the capability information to an external server through a network. At this point, a random number generated with the external server is acquired, as the random number acquired in the acquiring of the random number, through the network, and a result of a first determination made by the external server is acquired, as the result of the first determination acquired in the acquiring of the result of the first determination, through the network.

Therefore, a processing load on the source device can be reduced.

The method may further include transmitting the received certification information and the second signature information to an external server through a network. At this point, a random number generated with the external server is acquired, as the random number acquired in the acquiring of the random number, through the network, a result of a first determination made by the external server is acquired, as the result of the first determination in the acquiring of the result of the first determination, through the network, and a result of a second determination made by the external server is acquired, as the result of the second determination in the acquiring of the result of the second determination, through the network.

Therefore, the processing load on the source device can be reduced.

Each of the first secret key and the first public key may be an encryption key that the sink device previously retains.

Therefore, when the HDMI connection to the sink device is established, the first public key used to make the first determination can easily be acquired, and the first determination can easily be made.

Another aspect of the present disclosure provides a method for use in a sink device, the method including: receiving a random number from the source device through a High Definition Multimedia Interface-Consumer Electronics Control (HDMI-CEC) bus; encrypting the received random number with a first secret key corresponding to the sink device; and transmitting first signature information and capability information to the source device through the HDMI-CEC bus, the first signature information being obtained by encrypting the random number, the capability information storing therein information about a display capability of the sink device.

Therefore, the sink device can cause the source device to easily determine that the capability information transmitted to the source device is the information transmitted from the sink device.

Another aspect of the present disclosure provides a method for use in an AV system including a sink device and a source device, the method including: the source device acquiring a random number; the source device transmitting the acquired random number to the sink device through a High Definition Multimedia Interface-Consumer Electronics Control (HDMI-CEC) bus; the sink device receiving the random number from the source device though the HDMI-CEC bus; the sink device encrypting the received random number with a first secret key corresponding to the sink device; the sink device transmitting first signature information and capability information to the source device though the HDMI-CEC bus, the first signature information being obtained by encrypting the random number, the capability information storing therein information about a display capability of the sink device; the source device receiving the first signature information and the capability information from the sink device though the HDMI-CEC bus, the first signature information being information in which the random number is encrypted with the first secret key correlated with the sink device, the capability information being information about the display capability of the sink device; the source device acquiring a result of a first determination whether first decrypted information is compatible with the transmitted random number, the first decrypted information being obtained by decrypting the received first signature information with a first public key correlated with the sink device; when the result of the first determination is that the first decrypted information is compatible with the transmitted random number, the source device determining that the received capability information is correct information; and the source device outputting video corresponding to the capability information determined to be correct information to the sink device.

Therefore, the source device can easily determine that the received capability information is the information transmitted from the sink device. That is, the source device can easily determine whether man-in-the-middle attack occurs between the source device and the sink device. The use of the communication through the HDMI-CEC bus can easily conduct communication between the source device and the sink device even if another device is connected in the form of HDMI between the source device and the sink device.

These comprehensive or specific aspects may be implemented by a device, a system, an integrated circuit, a computer program, or a computer-readable recording medium such as a CD-ROM, or implemented by any combination of a device, a system, an integrated circuit, a computer program, and a recording medium.

Hereinafter, an authentication method, a notification method, a source device, and a sink device according to one aspect of the present disclosure will specifically be described with reference to the drawings.

The following exemplary embodiments each illustrate a specific example of the present disclosure. Numerical values, shapes, components, arranged positions and connection forms of the components, steps, orders of steps, etc., to be used in the following exemplary embodiments are illustrative and are not to limit the scope of the present disclosure.

Those components introduced in the following exemplary embodiments that are not recited in the independent claim(s) representing the most superordinate concept are illustrated herein as optional components.

First Exemplary Embodiment

In Cases 2 and 3, the compatible content cannot be prevented from being provided to the incompatible device even if the license contract of the standardization organization is used, even if the mechanism of the HDMI EDID is used, or even if the mechanism of the HDMI-CEC bus is used. Accordingly, in an authentication method according to a first exemplary embodiment, the more secure determination of the compatible device is made by a combination of device authentication in which an encryption technology is used and the mechanism of the HDMI-CEC bus. That is, the standardization organization issues a device key to the display device that is the compatible device, whether the display device is the compatible device is determined using the issued device key, and the compatible content is prevented from being provided to the incompatible device.

The first exemplary embodiment will be described below with reference to FIGS. 4 to 8.

[1-1. Configuration]

Figure 4:
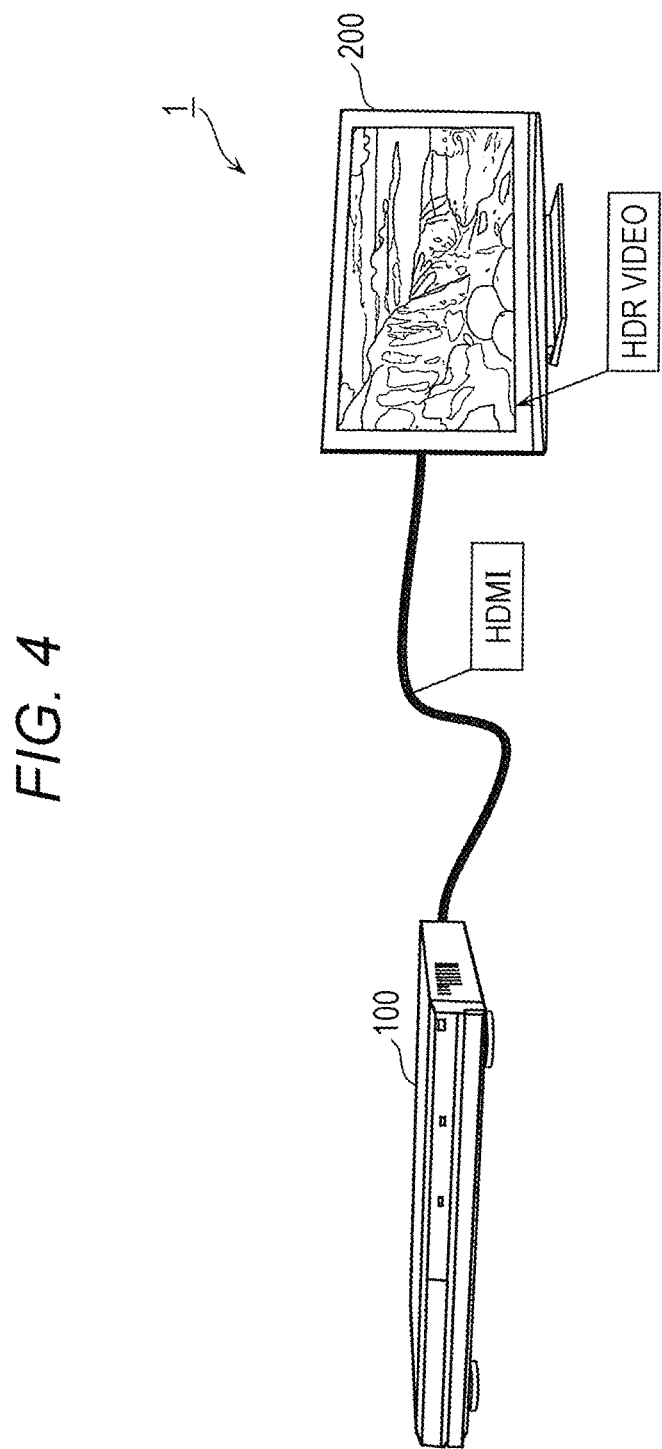
FIG. 4 is a view illustrating a configuration of an AV system according to a first exemplary embodiment.

FIG. 4 is a view illustrating a configuration of an AV system of the first exemplary embodiment.

As illustrated in FIG. 4, AV system 1 includes source device 100 and sink device 200. Source device 100 and sink device 200 are connected to each other through an HDMI cable. It is only necessary to connect source device 100 and sink device 200 in the form of HDMI, and the connection form may be either wired or wireless.

Source device 100 is a reproduction device, for example a UHD BD player. Source device 100 may be the UHD BD player or STB that receives the distribution of the compatible content and provides the received compatible content to sink device 200. Source device 100 is the compatible device. Source device 100 outputs (transmits) the reproduced compatible content to sink device 200 through the HDMI communication connection.

Sink device 200 is a display device, for example an HDRTV that can display the HDR video. Sink device 200 is the compatible device. Sink device 200 receives the compatible content output from source device 100 through the HDMI communication connection.

A functional configuration of AV system 1 will be described below.

Figure 5:
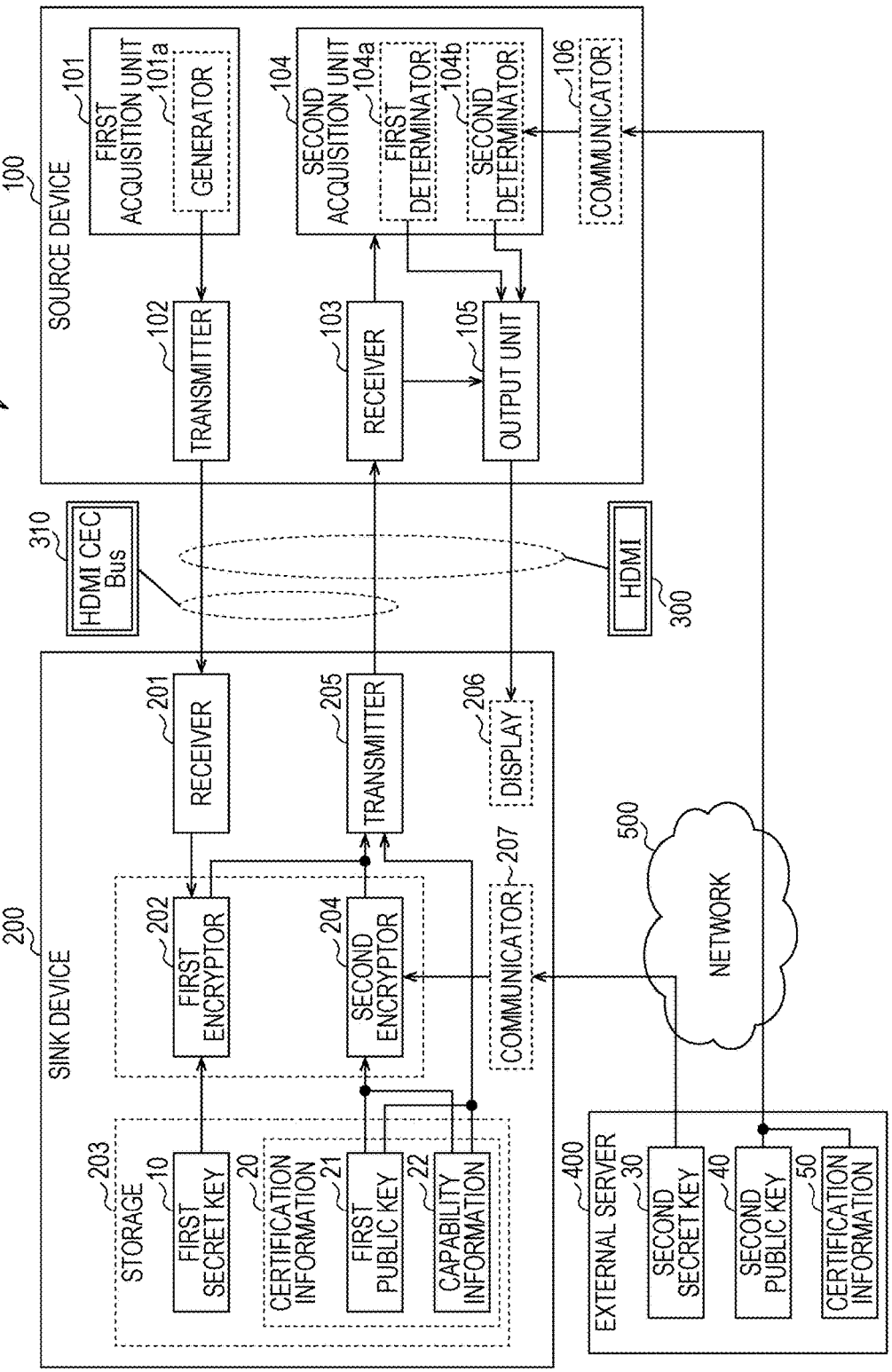
FIG. 5 is a block diagram illustrating an example of a functional configuration of the AV system according to the first exemplary embodiment.

FIG. 5 is a block diagram illustrating an example of the functional configuration of the AV system according to the first exemplary embodiment.

Source device 100 includes first acquisition unit 101, transmitter 102, receiver 103, second acquisition unit 104, and output unit 105 as the functional configuration. Source device 100 may further include communicator 106.

First acquisition unit 101 acquires a nonce (number used once) that is a disposable random number that is used only once. First acquisition unit 101 includes generator 101a that generates the nonce. That is, first acquisition unit 101 acquires the nonce generated in source device 100. The nonce needs to be a sufficiently long bit string, for example, about 128 bits. For example, first acquisition unit 101 is constructed with a processor and a memory in which a program is stored.

Transmitter 102 transmits the nonce acquired with first acquisition unit 101 to sink device 200 by communication through HDMI-CEC bus 310 of HDMI 300. Specifically, transmitter 102 transforms the nonce into data corresponding to the communication protocol of HDMI-CEC bus 310, and transmits the transformed nonce to sink device 200 by communication through HDMI-CEC bus 310. For example, transmitter 102 is constructed with a processor, a memory in which a program is stored, and an HDMI terminal.

Receiver 103 receives the first signature information and capability information 22 from sink device 200 by communication through HDMI-CEC bus 310. The first signature information is information about the nonce encrypted using first secret key 10 correlated with sink device 200. Capability information 22 is information about display capability of sink device 200. Receiver 103 receives certification information 20 and the second signature information from sink device 200. Certification information 20 is constructed with first public key 21 and capability information 22. The second signature information is information in which sink device 200 encrypts certification information 20 using second secret key 30 acquired from the outside. Capability information 22 is information indicating that the standardization organization certifies that sink device 200 is the display device satisfying the quality criterion, and is information (Cert) certifying the compatible device. For example, receiver 103 is constructed with a processor, a memory in which a program is stored, and an HDMI terminal.

Second acquisition unit 104 acquires a result of the first determination whether the first decrypted information is compatible with the nonce transmitted from transmitter 102. The first decrypted information is obtained by decrypting the first signature information received with receiver 103 using first public key 21 correlated with sink device 200. Second acquisition unit 104 acquires a result of the second determination whether the second decrypted information is correct. The second decrypted information is obtained by decrypting the second signature information received with receiver 103 using second public key 40. Second public key 40 correlated with second secret key 30 is acquired from the outside with source device 100. Second acquisition unit 104 includes first determinator 104a that makes the first determination and second determinator 104b that makes the second determination. That is, second acquisition unit 104 acquires a result of the first determination made in source device 100. Second acquisition unit 104 acquires a result of the second determination made in source device 100. First determinator 104a decrypts first signature information using first public key 21 included in certification information 20 received with receiver 103, thereby obtaining the first decrypted information. For example, second acquisition unit 104 is constructed with a processor and a memory in which a program is stored.

When the first decrypted information is compatible with the nonce transmitted from transmitter 102 as a result of the first determination, and when the second decrypted information is correct as a result of the second determination, output unit 105 determines that received capability information 22 is correct, and outputs the video corresponding to capability information 22 to sink device 200. Output unit 105 outputs the video to sink device 200 through HDMI 300. For example, output unit 105 is constructed with a processor, a memory in which a program is stored, and an HDMI terminal.

Communicator 106 is connected to external server 400 provided outside through network 500 such as the Internet and a dedicated line, and acquires second public key 40 from external server 400. Communicator 106 transmits acquired second public key 40 to second determinator 104b of second acquisition unit 104. For example, communicator 106 is constructed with a processor, a memory in which the program is stored, and a communication interface (I/F). Specifically, the communication I/F is a network interface that transmits and receives data to and from another device through the network. For example, the communication I/F may be a wireless local area network (LAN) interface compatible with an IEEE802.11a, b, g, or n standard. For example, the communication I/F may be a wired LAN interface compatible with an Ethernet standard. For example, the communication I/F may be a wireless communication interface compatible with a Bluetooth (registered trademark) standard.

For example, the processing functions of first acquisition unit 101, transmitter 102, receiver 103, second acquisition unit 104, output unit 105, and communicator 106 are implemented by a microcomputer, a processor, or a dedicated circuit. That is, each processor constituting source device 100 may be constructed with either software or hardware.

Sink device 200 includes receiver 201, first encryptor 202, second encryptor 204, and transmitter 205 as the functional configuration. Sink device 200 may further include storage 203. Sink device 200 may further include display 206. Sink device 200 may further include communicator 207.

Receiver 201 receives the nonce from source device 100 by communication through HDMI-CEC bus 310 of HDMI 300. For example, receiver 201 is constructed with a processor, a memory in which a program is stored, and an HDMI terminal.

First encryptor 202 of sink device 200 encrypts the received nonce using corresponding first secret key 10. Specifically, first encryptor 202 encrypts the nonce using first secret key 10 stored in storage 203. For example, first encryptor 202 is constructed with a processor and a memory in which a program is stored.

Storage 203 retains first secret key 10, first public key 21, and capability information 22. First secret key 10 and first public key 21 are encryption keys making a pair, and are previously retained by sink device 200. For example, storage 203 is constructed with a storage such as a flash memory or a hard disk drive (HDD). Sink device 200 needs not to include storage 203, but may acquire first secret key 10, first public key 21, and capability information 22 from an external storage such as a USB memory.

Second encryptor 204 encrypts certification information 20 stored in storage 203 using second secret key 30 acquired from the outside. For example, second encryptor 204 is constructed with a processor and a memory in which a program is stored.

Transmitter 205 transmits the first signature information, which is obtained by encrypting the nonce with first encryptor 202, and capability information 22 to source device 100 by communication through HDMI-CEC bus 310. Transmitter 205 transmits capability information 22 to source device 100 by transmitting the second signature information. That is, transmitter 205 transmits the first signature information and the second signature information to source device 100 by communication through HDMI-CEC bus 310. For example, transmitter 205 is constructed with a processor, a memory in which a program is stored, and an HDMI terminal.

Display 206 receives the video output from source device 100 through HDMI 300, and displays the video. For example, display 206 is constructed with a processor, a memory in which a program is stored, and a display device (such as a liquid crystal display and an organic electroluminescence (EL) display).

Communicator 207 is connected to external server 400 provided outside through network 500 such as the Internet and a dedicated line, and acquires second secret key 30 from external server 400. Communicator 207 transmits acquired second secret key 30 to second encryptor 204. For example, communicator 207 is constructed with a processor, a memory in which the program is stored, and a communication I/F. A specific example of the communication I/F is described above.

For example, processing functions of receiver 201, first encryptor 202, second encryptor 204, transmitter 205, display 206, and communicator 207 are implemented by a microcomputer, a processor, or a dedicated circuit. That is, each processor constituting sink device 200 may be constructed with either software or hardware.

HDMI-CEC bus 310 is bidirectional information transmitting means in which one signal line is used.

[1-2. Operation]

Operation of AV system 1 will be described below with reference to FIGS. 6 to 8.

Figure 6:
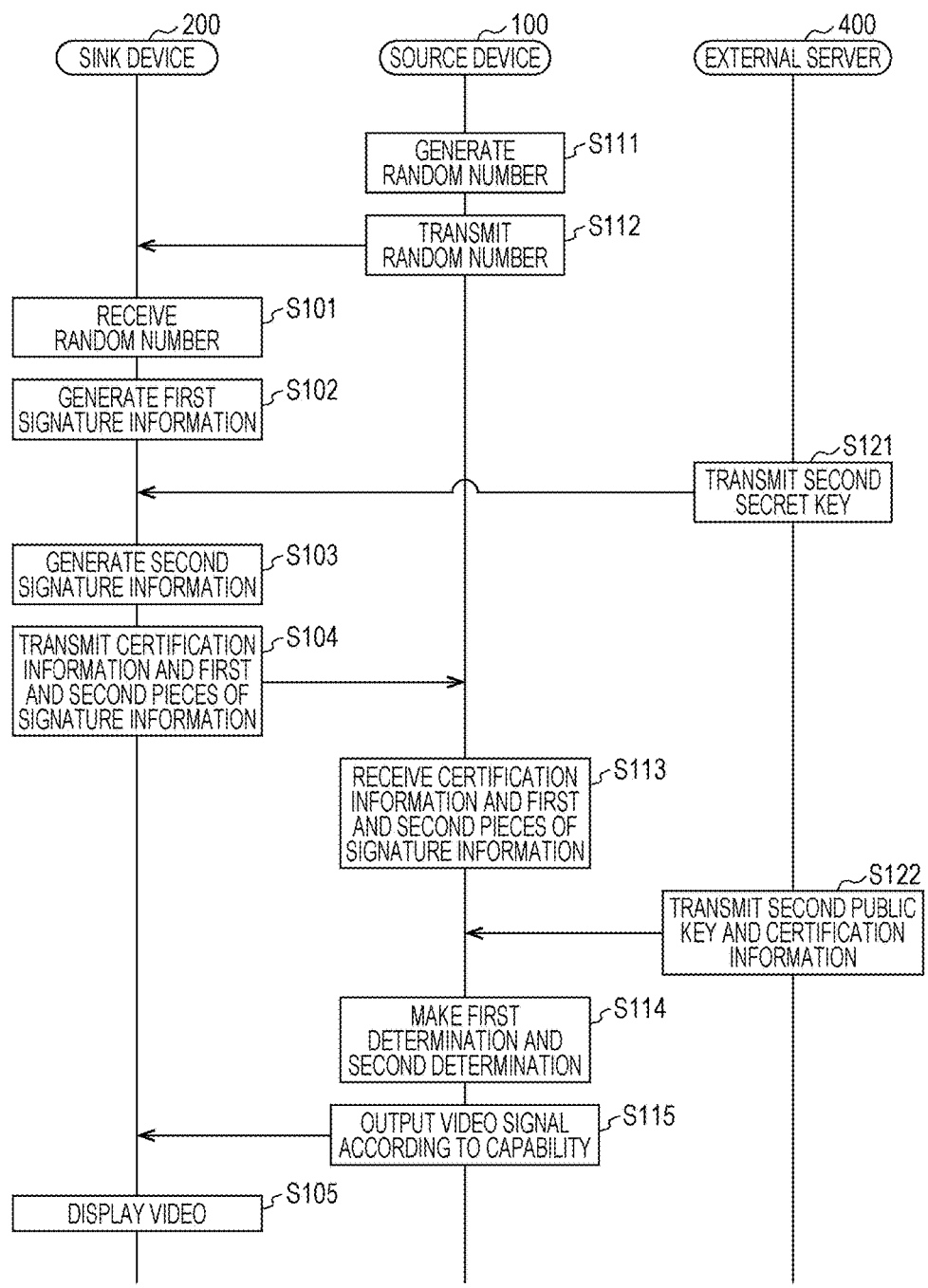
FIG. 6 is a sequence chart illustrating authentication processing of authenticating a sink device in the AV system according to the first exemplary embodiment.

FIG. 6 is a sequence chart illustrating authentication processing of authenticating the sink device in the AV system of the first exemplary embodiment. In other words, FIG. 6 is a sequence chart illustrating communication when single source device 100 checks the display capability of sink device 200.

In source device 100, generator 101a generates a random value (random number) as the nonce (S111). It is necessary that the nonce be a bit string having an enough length, for example, about 128 bits. Transmitter 102 of source device 100 transmits the generated nonce to sink device 200 by communication through HDMI-CEC bus 310 (S112).

Then, in sink device 200, receiver 201 receives the nonce transmitted from source device 100 through HDMI-CEC bus 310 (S101). In sink device 200, first encryptor 202 encrypts the received nonce using first secret key 10 stored in storage 203, thereby generating the first signature information (Signature) (S102). For example, the signature is generated by methods such as elliptic curve encryption and RSA encryption.

At this point, external server 400 transmits second secret key 30 retained by external server 400 to sink device 200 (S121). Specifically, external server 400 receives a request to transmit second secret key 30 from sink device 200, thereby transmitting second secret key 30 to sink device 200. Sink device 200 needs not to acquire second secret key 30 through network 500, but may previously store second secret key 30 in storage 203 of sink device 200 during production for example. In this case sink device 200 needs neither to be connected to network 500 nor to include communicator 207.

In sink device 200, second encryptor 204 encrypts certification information 20 stored in storage 203 using second secret key 30 received from external server 400, thereby generating the second signature information (S103). In sink device 200, transmitter 205 transmits the certification information, the first signature information generated with first encryptor 202, and the second signature information generated with second encryptor 204 to source device 100 (S104). Transmitter 205 transmits the certification information, the first signature information, and the second signature information using the communication function of HDMI-CEC bus 310.

Then, in source device 100, receiver 103 receives the certification information, the first signature information, and the second signature information from sink device 200 through HDMI-CEC bus 310 (S113).

At this point, external server 400 transmits second public key 40 and certification information 50, which are retained by external server 400, to source device 100 (S122). Specifically, external server 400 receives a request to transmit second public key 40 and certification information 50 from source device 100, thereby transmitting second public key 40 and certification information 50 to source device 100.

Source device 100 needs not to acquire second public key 40 and certification information 50 through network 500. Source device 100 may previously store second public key 40 and certification information 50 in a storage (such as a ROM), not illustrated, during production for example, or acquire second public key 40 and certification information 50 by reproducing an optical disk in which second public key 40 and certification information 50 are stored together with the content. In this case, source device 100 needs neither to be connected to network 500 nor to include communicator 106. Source device 100 needs not to simultaneously acquire both the second public key 40 and certification information 50, but may acquire at least one of second public key 40 and certification information 50 by any one of the above methods.

Source device 100 makes the first determination and the second determination (S114).

The first determination is determination that is made with first determinator 104a to check whether the first signature information received from sink device 200 is correct with respect to the generated nonce. First determinator 104a determines (verifies) whether the first signature information is compatible with the transmitted nonce by decrypting the first signature information using first public key 21 stored in certification information 20 received from sink device 200. Because first secret key 10 and first public key 21 make a pair, the verification is successfully made using only first public key 21 corresponding to first secret key 10 used to generate the first signature information.

The second determination is determination that is made with second determinator 104b to check whether the second signature information received from sink device 200 is correct. Specifically, second determinator 104b makes the second determination, namely, determines (verifies) whether the decrypted result is included in certification information 50 acquired from external server 400 by decrypting the second signature information using second public key 40. Because second secret key 30 and second public key 40 make a pair, the verification is successfully made using only second public key 40 corresponding to second secret key 30 used to generate the second signature information.

When the two kinds of the pieces of signature information (the first signature information and the second signature information) are successfully verified by making the first determination and the second determination, it can be checked for the first time that capability information 22 of sink device 200 is correct.

Therefore, in source device 100, output unit 105 outputs the video according to the display capability of the sink device 200, the display capability of the sink device 200 being indicated by received capability information 22 (S115). Specifically, output unit 105 outputs the HDR signal corresponding to the HDR video when capability information 22 indicates that the standardization organization certifies that sink device 200 is the device satisfying the quality criterion of the HDR video. On the other hand, output unit 105 needs not to output the HDR signal when capability information 22 indicates that the standardization organization does not certify that sink device 200 is the device satisfying the quality criterion of the HDR video.

Then, in sink device 200, display 206 displays the video output from source device 100 (S105).

The authentication processing in source device 100 will be described in detail below.

Figure 7:
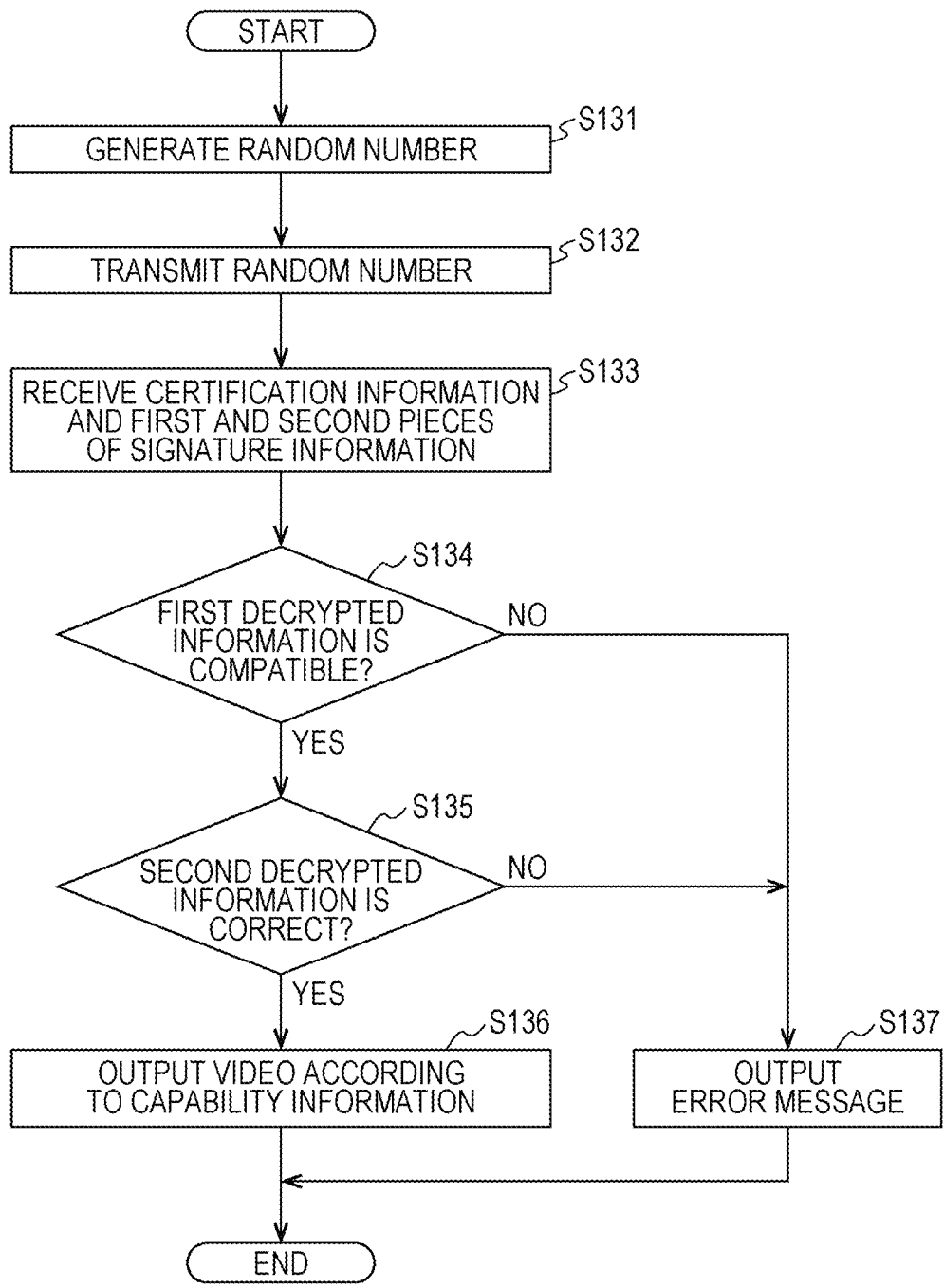
FIG. 7 is a flowchart illustrating the authentication processing in a source device.

FIG. 7 is a flowchart illustrating the authentication processing in the source device.

In source device 100, generator 101a generates the nonce (S131), and transmitter 102 transmits the generated random number to sink device 200 (S132).

Then, receiver 103 receives certification information 20, the first signature information, and the second signature information from sink device 200 (S133).

First determinator 104a makes the first determination whether the first decrypted information obtained by decrypting the first signature information using first public key 21 is compatible with the transmitted random number (S134).

When first determinator 104a determines that the first decrypted information is compatible with the random number (Yes in S134), second determinator 104b makes the second determination whether the second decrypted information obtained by decrypting the second signature information using second public key 40 is correct (S135).

When second determinator 104b determine that the second decrypted information is correct (Yes in S135), output unit 105 outputs the video corresponding to capability information 22 to sink device 200 through HDMI 300 (S136).

On the other hand, when first determinator 104a determines that the first signature information is not compatible (No in S134), or when second determinator 104b determines that the second signature information is incorrect (No in S135), output unit 105 may output an error message stored in a storage (ROM), not illustrated, to sink device 200 through HDMI 300 (S137). The error message notifies a user that sink device 200 does not satisfy the quality criterion for displaying the HDR video. When outputting the error message, output unit 105 needs not to output the video, or output unit 105 may output the video on which the error message is superposed. When the negative determination is made in step S135, output unit 105 outputs neither the error message nor the video.

When output unit 105 outputs the video corresponding to capability information 22 or the error message, source device 100 ends the authentication processing.

Notification processing in sink device 200 for the purpose of the authentication processing in AV system 1 will be described in detail below.

Figure 8:
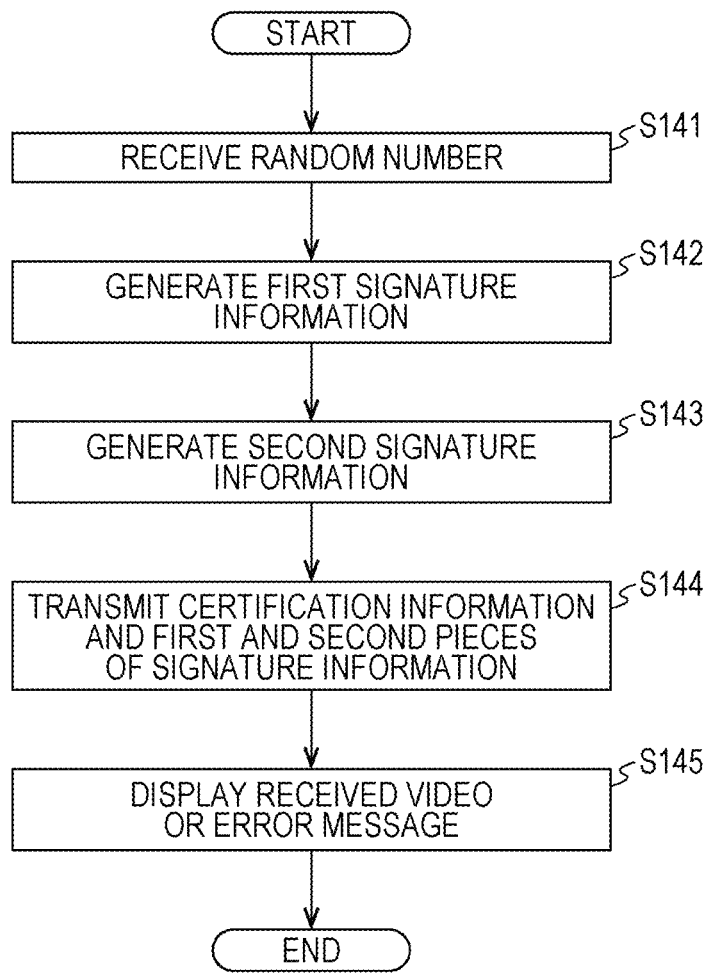
FIG. 8 is a flowchart illustrating notification processing in the sink device.

FIG. 8 is a flowchart illustrating the notification processing in the sink device.

Receiver 201 of sink device 200 receives the nonce, which is generated with source device 100, through HDMI-CEC bus 310 (S141).

First encryptor 202 generates the first signature information by encrypting the received nonce using first secret key 10 (S142). Second encryptor 204 generates the second signature information by encrypting certification information 20 stored in storage 203 using second secret key 30 (S143).

Transmitter 205 transmits certification information 20 stored in storage 203, the generated first signature information, and the generated second signature information to source device 100 by communication through HDMI-CEC bus 310 (S144).

Display 206 displays the video or the error message output from source device 100 through HDMI 300 (S145).

[1-3. Effect and the Like]

In the authentication method of the first exemplary embodiment, source device 100 transmits the random number generated by communication through HDMI-CEC bus 310 to sink device 200, and source device 100 receives the first signature information and capability information 22 from sink device 200 by communication through HDMI-CEC bus 310. Source device 100 compares the transmitted random number to the first decrypted information, which is decrypted using first public key 21 paired with first secret key 10 used to encrypt the first signature information. When the first decrypted information is compatible with the transmitted random number, source device 100 outputs the video corresponding to received capability information 22.

Therefore, source device 100 can easily determine that received capability information 22 is the information transmitted from sink device 200. That is, source device 100 can easily determine whether the man-in-the-middle attack occurs between source device 100 and sink device 200. The use of the communication through HDMI-CEC bus 310 can easily conduct communication between source device 100 and sink device 200 even if another device is connected in the form of HDMI between source device 100 and sink device 200.

In the authentication method of the first exemplary embodiment, source device 100 receives certification information 20 constructed with first public key 21 and capability information 22 and the second signature information that sink device 200 encrypts using second secret key 30 from sink device 200. Source device 100 makes the second determination whether the second decrypted information obtained by encrypting the received second signature information using second public key 40 is correct. When the first decrypted information is compatible with the transmitted random number as a result of the first determination, and when the second decrypted information is correct as a result of the second determination, source device 100 outputs the video corresponding to received capability information 22.

Thus, source device 100 can determine whether the spoofing attack in which an encryption key except for second secret key 30 is used is made by making the second determination. Using the results of the first determination and second determination, source device 100 can determine that certification information 20 received from sink device 200 is not falsified. Therefore, source device 100 can easily determine whether sink device 200 is the device satisfying the quality criterion based on the capability information stored in certification information 20.

Second Exemplary Embodiment

In the first exemplary embodiment, source device 100 generates the random number, and makes the first determination and the second determination. Alternatively, an external device may generate the random number, and make the first determination and the second determination. AV system 1A according to a second exemplary embodiment has a configuration in which external server 600 connected to source device 100A through network 500 is caused to generate the random number, and to make the first determination and the second determination. The configuration of AV system 1A, which is different from that of AV system 1 of the first exemplary embodiment, will mainly be described below.

[2-1. Configuration]

Figure 9:
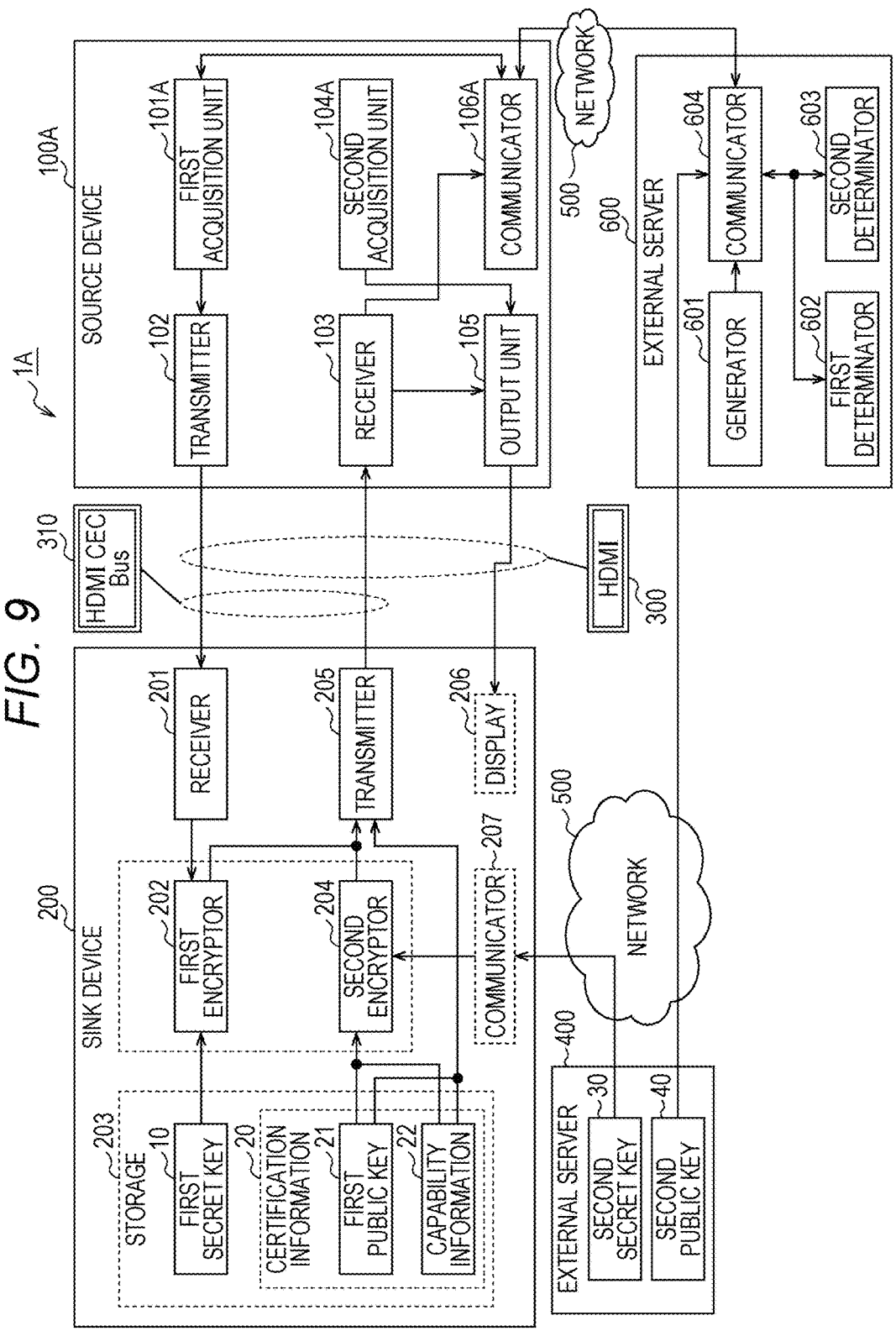
FIG. 9 is a block diagram illustrating an example of a functional configuration of an AV system according to a second exemplary embodiment.

FIG. 9 is a block diagram illustrating an example of the functional configuration of the AV system of the second exemplary embodiment.

AV system 1A of the second exemplary embodiment includes external server 600 in addition to source device 100A and sink device 200.

Unlike source device 100 of the first exemplary embodiment, first acquisition unit 101A of source device 100A does not include generator 101a. First acquisition unit 101A acquires the random number, which is generated with external server 600, from external server 600 through network 500. Specifically, first acquisition unit 101A acquires the random number that communicator 106A receives from external server 600 through network 500.

Unlike source device 100 of the first exemplary embodiment, second acquisition unit 104A includes neither first determinator 104a nor second determinator 104b. Second acquisition unit 104A acquires the first determination made by the external server 600 through network 500. Second acquisition unit 104A acquires the second determination made by the external server 600 through network 500. Specifically, second acquisition unit 104A acquires the results of the first determination and second determination that communicator 106A receives from external server 600 through network 500.

Communicator 106A is connected to externally-provided external server 600 through network 500 such as the Internet and a dedicated line, and receives the random number and the results of the first determination and second determination from external server 600. Communicator 106A transmits the certification information, first signature information, and second signature information, which are received with receiver 103, to external server 600.

External server 600 includes generator 601, first determinator 602, second determinator 603, and communicator 604 as a functional configuration.

Generator 601 functions similarly to generator 101a of the first exemplary embodiment. First determinator 602 functions similarly to first determinator 104a of the first exemplary embodiment. Second determinator 603 functions similarly to second determinator 104b of the first exemplary embodiment. Second determinator 603 makes the second determination using second public key 40 that communicator 604 receives from external server 400 through network 500.

Communicator 604 is connected to source device 100A and external server 400 through network 500 such as the Internet or a dedicated line, and transmits and receives information to and from source device 100A or external server 400. Specifically, communicator 604 receives the certification information, the first signature information, and the second signature information from source device 100A. Communicator 604 transmits the generated random number and the results of the first determination and second determination to source device 100A. Communicator 604 receives second public key 40 from external server 400.

Because sink device 200 has the configuration similar to sink device 200 of the first exemplary embodiment, the description thereof is omitted.

External server 400 and external server 600 may be a single server having the functions of external servers 400 and 600.

[2-2. Operation]

The operation of AV system 1A will be described below with reference to FIG. 10.

Figure 10:
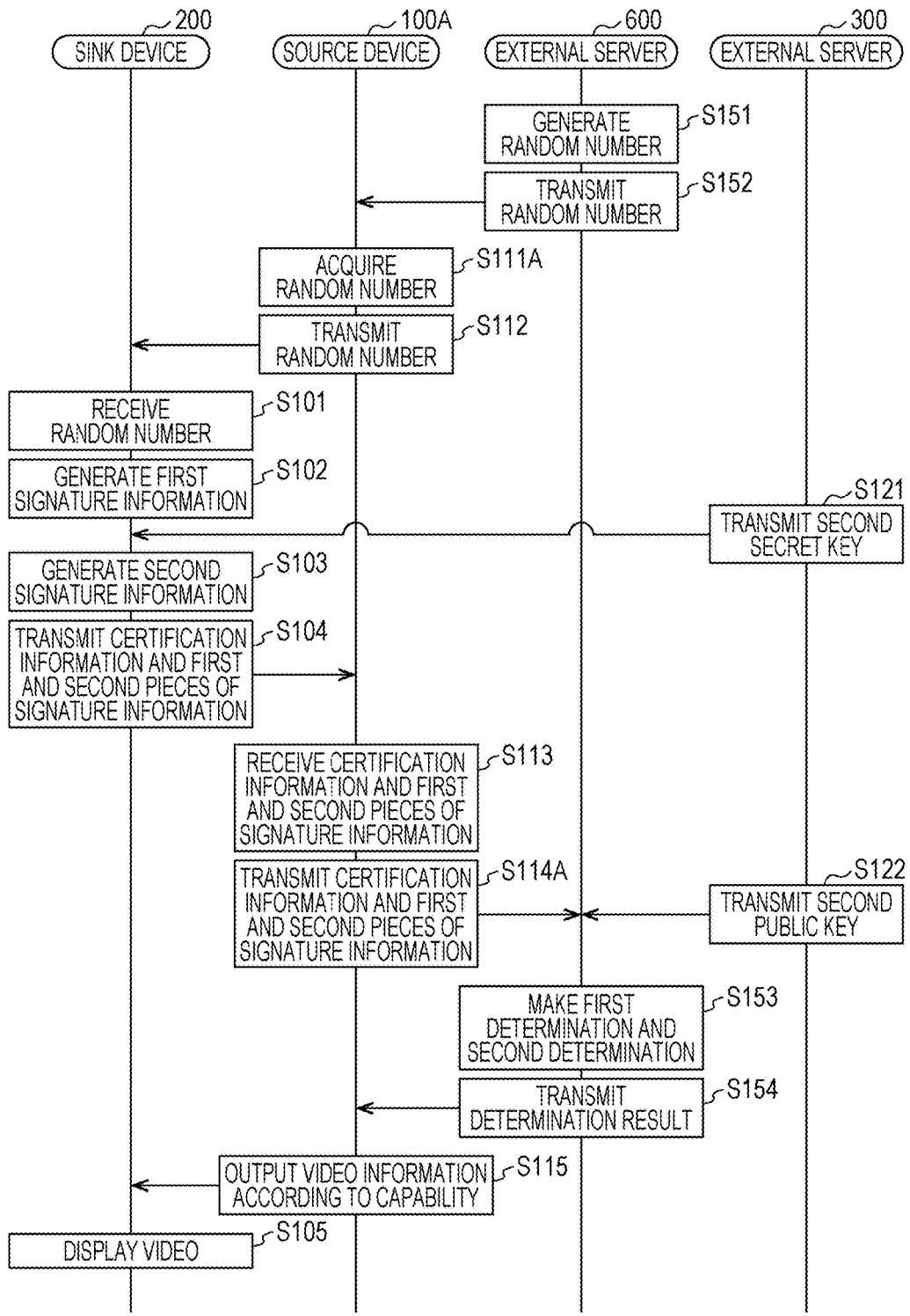
FIG. 10 is a sequence chart illustrating the authentication processing of authenticating the sink device in the AV system according to the second exemplary embodiment.

FIG. 10 is a sequence chart illustrating the authentication processing of authenticating the sink device in the AV system of the second exemplary embodiment. In other words, FIG. 10 is a sequence chart illustrating communication when source device 100 checks the display capability of sink device 200 using the processing capability of external server 600 connected to the network.

In the second exemplary embodiment, source device 100A does not generate the random number, but asks external server 600 to generate the random number, and transmits the acquired random number to sink device 200.

That is, generator 601 of external server 600 generates the random number (S151), and communicator 604 transmits the generated random number to source device 100A through network 500 (S152). Then, first acquisition unit 101A of source device 100A acquires the random number received with communicator 106 (S111A). Transmitter 102 transmits the random number to sink device 200 (S112).

In sink device 200, the pieces of processing similar to the first exemplary embodiment are performed (S101 to S104), and transmitter 205 transmits the certification information, the first signature information, and the second signature information to source device 100A.

In source device 100A, receiver 103 receives the certification information, the first signature information, and the second signature information (S113), and communicator 106 transmits the certification information, first signature information, and second signature information, which are received with receiver 103, to external server 600 through network 500 (S114A). That is, source device 100A directly transmits the certification information, first signature information, and second signature information, which are received from sink device 200, to external server 600.

Then, in external server 600, first determinator 602 makes the first determination, and second determinator 603 makes the second determination (S153). That is, external server 600 makes the first determination and second determination, which are processed with source device 100 in the first exemplary embodiment. Communicator 604 transmits each determination result to source device 100A through network 500 (S154). Only when checking that sink device 200 has the display capability as results of the first determination and second determination, communicator 604 of external server 600 may notify source device 100A that sink device 200 has the display capability. Because the first determination and second determination of the second exemplary embodiment are similar to those of the first exemplary embodiment, the detailed description thereof is omitted.

Because steps S121, S122, S115, and S105 of the second exemplary embodiment are similar to those of the first exemplary embodiment, the description thereof is omitted.

[2-3. Effect and the Like]

In the authentication method of the second exemplary embodiment, external server 600 generates the random number and makes the first determination and the second determination, so that a processing load on source device 100A can be reduced.

[3-1. Modifications]

In the first exemplary embodiment, the error message previously stored in the storage is output when the first signature information or the second signature information is determined to be incorrect. Alternatively, the error message may be stored in a predetermined data area of the UHD BD. That is, when the first signature information or the second signature information is determined to be incorrect while source device 100 that is the UHD BD player reproduces the UHD BD, source device 100 may output the error message stored in the predetermined data area.

For source device 100 that is the UHD BD player, after determining whether sink device 200 connected in the form of HDMI is the incompatible device, source device 100 may read the determination result as a flag of source device 100 from BD-J (Java (registered trademark)). Therefore, a user interface more comprehensive for the user can be constructed.

In the first and second exemplary embodiments, both the first determination and the second determination are made. Alternatively, only the first determination may be made. Even if only the first determination is made, it is secured that the certification information is transmitted from sink device 200.

In the first and second exemplary embodiments, in case that first secret key 10 provided to sink device 200 satisfying the quality criterion leaks outside, another sink device having the display capability not satisfying the quality criterion can notify source device 100 of false capability information using the certification information corresponding to sink device 200. In this case, an identifier (ID) is provided to certification information 20, and source device 100 acquires a certificate revocation list in which a list of pieces of invalid certification information is stored from an external server or a recording medium such as an optical disk. Therefore, source device 100 needs not to output the video to the sink device that transmits the certification information, or may output another video.

Additionally, even if a device not satisfying the quality criterion is sold as the compatible device, the encryption key corresponding to the device not satisfying the quality criterion may be revoked to force source device 100 to stop the output to the sink device. The revoked device may be black-listed and stored in source device 100. When determining that the sink device 200 connected to source device 100 in the form of HDMI is included in the black list, source device 100 may stop the output of the video to sink device 200.

At first, the operation is started only by the mechanism of the EDID described in the knowledge underlying the present disclosure. When fraud is rampant, the authentication processing of the first and second exemplary embodiments in which the encryption technology (device key (secret key)) and the CEC bus are used may be added to the device compatible with the quality criterion.

[4-1. Others]

Figure 11:
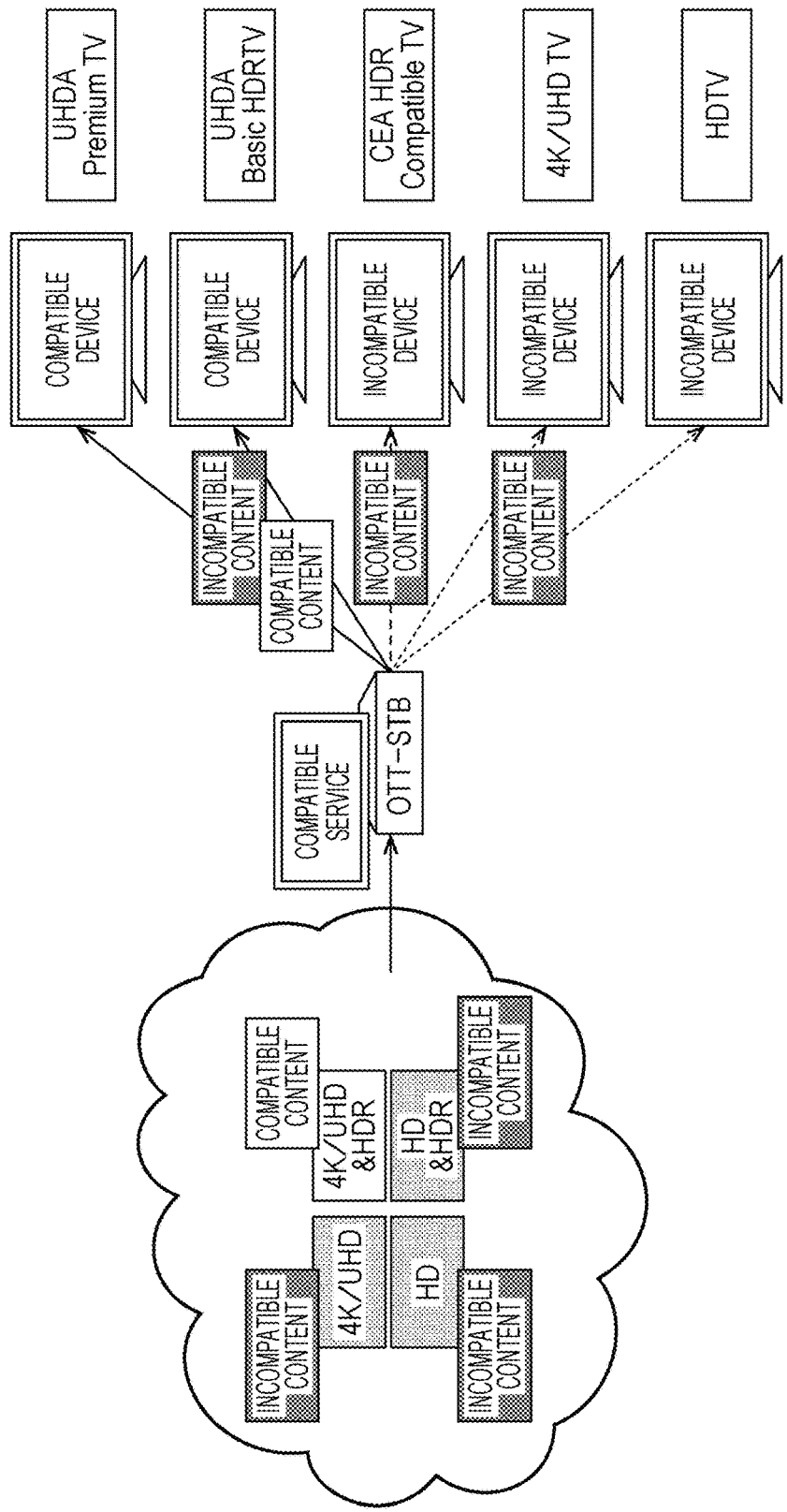
FIG. 11 is a view illustrating a relationship among a compatible content, a compatible service, and a compatible device in Case 2.

FIG. 11 is a view illustrating a relationship among the compatible content, the compatible service, and the compatible device in Case 2.

Even in Case 2, as illustrated in FIG. 11, the destination of the compatible content can be limited to the compatible service and the compatible device by performing the authentication methods of the first and second exemplary embodiments.

FIG. 12 is a view illustrating a relationship among the compatible content, the compatible service, and the compatible device in Case 3.

Even in Case 3, as illustrated in FIG. 12, the destination of the compatible content can be limited to the compatible service and the compatible device by performing the authentication methods of the first and second exemplary embodiments.

In the first and second exemplary embodiments, each component may be constructed with dedicated hardware, or implemented by executing a software program suitable for each component. A program executor such as a CPU and a processor may implement each component by reading and executing a software program recorded in a recording medium such as a hard disk drive and a semiconductor memory. The software performing the authentication methods of the exemplary embodiments is the following program.

That is, the program causes a computer to execute an authentication method in a source device that is communication-connected to a sink device in a form of High-Definition Multimedia Interface (HDMI) (registered trademark), the authentication method including: acquiring a random number; transmitting the acquired random number to the sink device by communication through an HDMI-CEC bus; receiving first signature information and capability information from the sink device by the communication, the first signature information being information in which the random number is encrypted using a first secret key correlated with the sink device, the capability information being information about display capability of the sink device; acquiring a result of a first determination whether first decrypted information is compatible with the transmitted random number, the first decrypted information being obtained by decrypting the received first signature information using a first public key paired with the first secret key; and when the first decrypted information is compatible with the transmitted random number as the result of the first determination, determining that the received capability information is correct information to output video corresponding to the capability information to the sink device.

The program causes a computer to execute a sink device capability notification method in a sink device that is communication-connected to a source device in a form of HDMI (registered trademark), the notification method including: receiving a random number from the source device by communication through an HDMI-CEC bus of the HDMI; encrypting the received random number using a first secret key corresponding to the sink device; and transmitting first signature information and capability information to the source device by the communication, the first signature information being obtained by encrypting the random number, the capability information storing therein information about display capability of the sink device.

The authentication method, notification method, source device, and sink device according to one or more aspects of the present disclosure are described above based on the exemplary embodiments. However, the present disclosure is not limited to the exemplary embodiments. The one or more aspects of the present disclosure may include, without departing from the scope of the present disclosure, an exemplary embodiment obtained by making various modifications which those skilled in the art would conceive to the present exemplary embodiment, or an exemplary embodiment obtained by combining components in different exemplary embodiments.

The present disclosure is useful as the authentication method, notification method, source device, and sink device for being able to easily limit the destination of the compatible content to the compatible service and the compatible device.

What is claimed is:

1. A method for use in a source device, the method comprising:
   acquiring a random number;
   transmitting the acquired random number to a sink device through a High Definition Multimedia Interface-Consumer Electronics Control (HDMI-CEC) bus;
   receiving first signature information and capability information from the sink device through the HDMI-CEC bus, the first signature information being information in which the random number is encrypted with a first secret key correlated with the sink device, and the capability information being information about a display capability of the sink device;

acquiring a result of a first determination whether first decrypted information is compatible with the transmitted random number, the first decrypted information being obtained by decrypting the received first signature information with a first public key paired with the first secret key;

acquiring a result of a second determination whether second decrypted information is correct information, the second decrypted information being obtained by decrypting second signature information with a second public key corresponding to a second secret key, the second public key being externally acquired with the source device, and the second secret key being an externally-acquired second secret key, wherein certification information and the second signature information are received from the sink device in the receiving, the certification information being constructed with the first public key and the capability information, the second signature information including information in which the sink device encrypts the certification information with the second secret key, when the result of the first determination is that the first decrypted information is compatible with the transmitted random number, and when the result of the second determination is that the second decrypted information is correct information, determining that the received capability information is correct information; and outputting video corresponding to the capability information determined to be correct information to the sink device, wherein each of the first secret key and the first public key is an encryption key that the sink device previously retains.

2. The method according to claim 1, wherein the random number is generated in the source device, and the first determination is made by the source device.

3. The method according to claim 2, wherein the second determination is made by the source device.

4. The method according to claim 1, further comprising transmitting the received first signature information and the capability information to an external server through a network, wherein the received random number is generated with the external server and acquired through the network, and the result of the first determination is made by the external server and acquired through the network.

5. The method according to claim 4, further comprising transmitting the received certification information and the second signature information to the external server through the network, the result of the second determination is made by the external server and acquired through the network.

6. A method for use in a sink device, the method comprising:

receiving a random number from the source device through a High Definition Multimedia Interface-Consumer Electronics Control (HDMI-CEC) bus;

encrypting the received random number with a first secret key corresponding to the sink device;

transmitting first signature information and capability information to the source device through the HDMI-CEC bus, the first signature information being obtained by encrypting the random number, and the capability information storing therein information about a display capability of the sink device;

encrypting certification information being constructed with a first public key and the capability information using an externally acquired second secret key so as to generate second signature information; and transmitting the certification information and the generated second signature information through the HDMI-CEC bus, wherein the first public key is paired with the first secret key, and wherein each of the first secret key and the first public key is an encryption key that the sink device previously retains.

7. A method for use in an Audio-Video (AV) system including a sink device and a source device, the method comprising:

acquiring, with the source device, a random number;

transmitting, with the source device, the acquired random number to the sink device through a High Definition Multimedia Interface-Consumer Electronics Control (HDMI-CEC) bus;

receiving, with the sink device, the random number from the source device though the HDMI-CEC bus;

encrypting, with the sink device, the received random number with a first secret key corresponding to the sink device;

transmitting, with the sink device, first signature information and capability information to the source device though the HDMI-CEC bus, the first signature information being obtained by encrypting the random number, and the capability information storing therein information about a display capability of the sink device;

receiving, with the source device, the first signature information and the capability information from the sink device though the HDMI-CEC bus, the first signature information being information in which the random number is encrypted with the first secret key correlated with the sink device, and the capability information including the information about the display capability of the sink device;

acquiring, with the source device, a result of a first determination whether first decrypted information is compatible with the transmitted random number, the first decrypted information being obtained by decrypting the received first signature information with a first public key correlated with the sink device;

encrypting, with the sink device, certification information being constructed with the first public key and the capability information using an externally acquired second secret key so as to generate second signature information; and transmitting, with the sink device, the certification information and the generated second signature information to the source device through the HDMI-CEC bus, wherein the first public key is paired with the first secret key, and wherein each of the first secret key and the first public key is an encryption key that the sink device previously retains;

acquiring, with the source device, a result of a second determination whether second decrypted information is correct information, the second decrypted information being obtained by decrypting the second signature information with a second public key corresponding to the externally acquired second secret key, the second public key being externally acquired with the source device, and the second secret key being an externally-acquired second secret key, wherein certification information and the second signature information are received by the source device from the sink device in the receiving, the certification information being constructed with the first public key and the capability information, the second signature information including information in which the sink device encrypts the certification information with the second secret key, when the result of the first determination is that the first decrypted information is compatible with the transmitted random number, and when the result of the second determination is that the second decrypted information is correct information, determining, with the source device, that the received capability information is correct information; and outputting, with the source device, video corresponding to the capability information determined to be correct information to the sink device.

8. A source device comprising:

a first acquisitioner that acquires a random number;

a transmitter that transmits the random number acquired with the first acquisitioner to a sink device through a High Definition Multimedia Interface-Consumer Electronics Control (HDMI-CEC) bus;

a receiver that receives first signature information and capability information from the sink device through the HDMI-CEC bus, the first signature information being information in which the random number is encrypted with a first secret key correlated with the sink device, and the capability information being information about a display capability of the sink device;

a second acquisitioner that acquires a result of a first determination whether first decrypted information is compatible with the random number transmitted from the transmitter, the first decrypted information being obtained by decrypting the first signature information received using the receiver with a first public key correlated with the sink device;

a third acquisitioner that acquires a result of a second determination whether second decrypted information is correct information, the second decrypted information being obtained by decrypting second signature information using a second public key corresponding to an externally-acquired second secret key, the second public key being externally acquired with the source device, wherein the receiver further receives certification information and the second signature information from the sink device through the HDMI-CEC bus, the certification information being constructed with the first public key and the capability information, the second signature information including information in which the certification information is encrypted with the second secret key, a determinator that determines that the capability information received using the receiver is correct information when the result of the first determination is that the first decrypted information is compatible with the random number transmitted from the transmitter, and when the result of the second determination is that the second decrypted information is correct information; and an output that outputs video corresponding to the capability information determined to be correct information to the sink device, wherein each of the first secret key and the first public key is an encryption key that the sink device previously retains.

9. A sink device comprising:

a receiver that receives a random number from a source device through a High Definition Multimedia Interface-Consumer Electronics Control (HDMI-CEC) bus;

a first encryptor that encrypts the random number received using the receiver with a first secret key included in the sink device;

a transmitter that transmits first signature information and capability information to the source device by the HDMI-CEC bus, the first signature information being obtained such that the first encryptor encrypts the random number, and the capability information storing therein information about a display capability of the sink device; and a second encryptor that encrypts certification information being constructed with a first public key and the capability information using an externally acquired second secret key so as to generate second signature information, wherein the transmitter transmits the certification information and the generated second signature information to the source device by the HDMI-CEC bus, wherein the first public key is paired with the first secret key, and wherein each of the first secret key and the first public key is an encryption key that the sink device previously retains.

* * * * *